United States Patent [19]

Mahaney

[11] Patent Number: 5,507,530
[45] Date of Patent: Apr. 16, 1996

[54] PLURAL MALE AND FEMALE FLUID COUPLER CONNECTING MECHANISM AND METHOD

[75] Inventor: F. Allen Mahaney, Sioux City, Iowa

[73] Assignee: Soo Tractor Sweeprake Company, Sioux City, Iowa

[21] Appl. No.: 437,274

[22] Filed: May 8, 1995

[51] Int. Cl.⁶ .................................................. F16L 35/00
[52] U.S. Cl. ...................... 285/26; 285/137.1; 285/312; 285/316; 29/237
[58] Field of Search .............................. 285/26, 29, 316, 285/311, 312, 137.1; 29/237

[56] References Cited

U.S. PATENT DOCUMENTS

| | | | |
|---|---|---|---|
| 2,333,423 | 11/1943 | Hufferd | 285/312 |
| 3,214,195 | 10/1965 | Zahurance et al. | 285/312 X |
| 3,527,480 | 9/1970 | Larson . | |
| 4,426,104 | 1/1984 | Hazelrigg . | |
| 4,494,775 | 1/1985 | Nash et al. . | |
| 4,615,546 | 10/1986 | Nash et al. . | |
| 4,804,208 | 2/1989 | Dye . | |
| 4,915,419 | 4/1990 | Smith . | |
| 5,316,347 | 5/1994 | Arosio . | |
| 5,344,194 | 9/1994 | Hatagishi et al. . | |

*Primary Examiner*—Dave W. Arola
*Attorney, Agent, or Firm*—Reising, Ethington, Barnard & Perry

[57] ABSTRACT

Male fluid couplers (14) are attached to a control valve (94) mounted in a holder (96). Female fluid couplers (16) have their sleeve members (72) held in an aperture (108) in a sleeve member retainer (110) by snap rings (112). Lever arms (122 and 124) are attached to the sleeve member retainer (110) by pins (126 and 128). Pins (134 and 135) on the lever arms enter slots (136) in the male holder (96). Movement of the lever arms (122 and 124) moves the female couplers (16) into engagement with the male fluid couplers and allows locking balls (40) to move into locking ball grooves (38). Upon release of the handle (130), the spring (80) moves the sleeve member (72) in a position locking balls (40) in the grooves (38). Movement of the handle (130) in the opposite direction moves the sleeve members (72) into position to release the balls (40) from the grooves (38). Continued movement of the handle (130) moves the female couplers (16) from engagement with the male couplers (14).

7 Claims, 3 Drawing Sheets

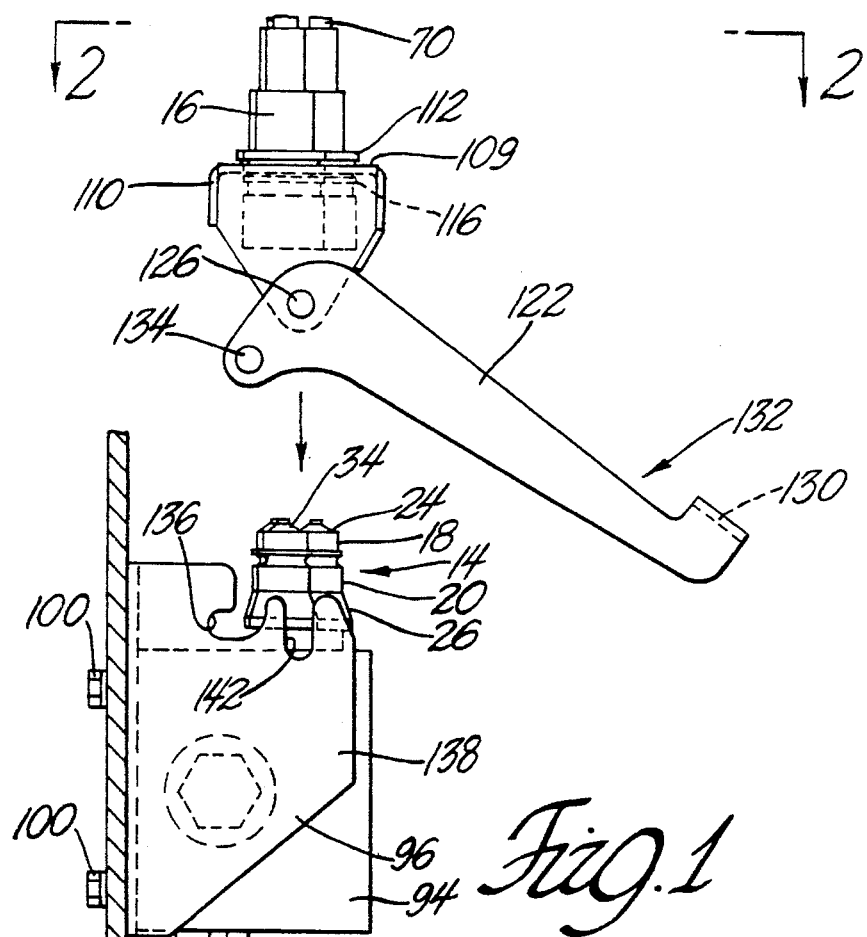
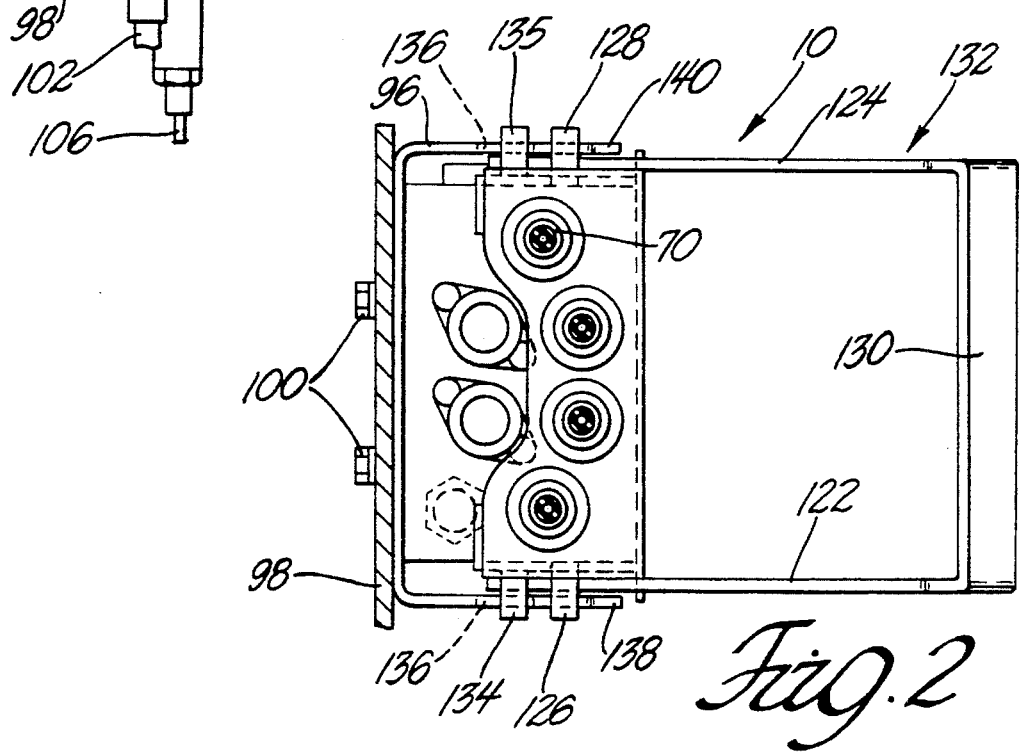

PLURAL MALE AND FEMALE FLUID COUPLER CONNECTING MECHANISM AND METHOD

TECHNICAL FIELD

This invention is in a coupler connecting mechanism and a method for connecting a plurality of male and female fluid couplers and more particularly in a mechanism for connecting male and female fluid couplers that have a plurality of locking balls that hold the male and female fluid couplers in engagement and a sliding sleeve for engaging and disengaging the locking balls.

BACKGROUND OF THE INVENTION

Fluid couplers with a male fluid coupler and a female fluid coupler are manufactured by a number of companies around the world. These couplers are used for connections in pneumatic and hydraulic systems. The couplers can generally be engaged and disengaged manually. In some systems it is necessary to reduce the pressure of the fluid before the couplers can be engaged or disengaged. Generally the couplers are engaged and disengaged by manipulating a locking assembly with one hand and simultaneously moving the male and female fluid couplers into or out of engagement with each other with the other hand. There are some couplers that automatically release and engage the locking assembly when the male and female fluid couplers are forced into engagement with each other. The force required to engage a male and female fluid coupler can be substantial.

Fluid transmission systems frequently have a number of separate pipes. These separate pipes have to be connected in the proper order. Failure to connect the pipes in the proper order may merely prevent a system from working properly. However, improper pipe connections may also cause damage to a machine, apparatus or article.

Fluid coupler connectors have been developed and are available for use which hold and connect a plurality of male and female fluid couplers. These fluid coupler connectors can insure that a plurality of male and female fluid connectors can only be connected in one order thereby eliminating the possibility of incorrect couplings. The fluid coupler connectors can be grouped closer together because space is no required for direct manual manipulation of each coupler locking assembly. A mechanical advantage is normally provided in order to generate sufficient force to engage a plurality of male and female fluid couplers simultaneously.

Some of the fluid coupler connectors that have been used hold individual male fluid couplers in engagement with female fluid couplers. The fluid coupler connector structure required to hold a plurality of male and female couplers in engagement with each other must have sufficient strength to hold the forces tending to separate the individual male and female fluid couplers. The fluid coupler connectors must also hold the male and female connectors in engagement with each other so as to prevent leaks. A slight separation or misalignment between a male fluid coupler and a female fluid coupler can result in fluid leaks. To prevent leaks and withstand the forces exerted by a plurality of male and female fluid couplers, a fluid coupler connector must be strong and accurately made.

Other fluid coupler connectors connect a plurality of male and female fluid connectors that have individual locking assemblies that maintain connections once a connection is made. These fluid coupler connectors reduce the forces on the connector structure once a connection is made between the male fluid couplers and the female fluid couplers. They also eliminate the requirement for the fluid coupler connector to hold the male and female fluid connectors in engagement to prevent leaks. However, these fluid coupler connectors require a structure to hold the male fluid couplers, a structure to hold the female fluid couplers, a structure to hold the locking assemblies and systems to move the three holding structures relative to each other.

SUMMARY OF THE INVENTION

An object of the invention is to provide a fluid coupler connector that is simple, economical and easy to operate.

Another object of the invention is to provide a fluid coupler connector with a male fluid coupling holder, a female fluid coupling retainer and a system for moving the holder relative to the retainer to connect and disconnect the male and female fluid couplers.

A further object of the invention is to provide a fluid coupler connector that holds and manipulates the sliding sleeve members of female fluid couplers to connect male and female fluid couplers to each other, to lock the male and female fluid couplers together, to unlock the male and female fluid couplers form each other and to separate the male and female fluid couplers from each other.

The fluid couplers include male fluid couplers and female fluid couplers. The male fluid couplers have a tubular body with an outer surface, an end surface and a locking ball groove recessed into the outer surface. The female fluid couplers have a cylindrical housing with a male coupler receiving bore and a plurality of locking ball passages passing through the cylindrical housing. A locking ball is mounted in each locking ball passage. A sleeve member is slidably journaled on the outer surface of the cylindrical housing. A land on the inside of the sleeve member holds the locking balls in positions in which the locking balls extend radially a distance equal to a portion of their diameters into the male coupler receiving bore. A first locking ball release recess in the sleeve member on a first side of the land can receive the locking balls and allow them to withdraw from the male coupler receiving bore. A second locking ball release recess in the sleeve member on a second side of the land can also receive the locking balls and allow them to withdraw from the male coupler receiving bore. A spring assembly is mounted on the cylindrical housing and biases the sleeve member to a position with the land adjacent to the locking ball passages. The spring assembly can be compressed to move the sleeve member to positions in which the first locking ball release recess is in alignment with the locking ball passages or the second locking ball release recess is in alignment with the locking ball passages.

A plurality of male fluid couplers are attached to a control valve. The control valve is attached to a male fluid coupler holder. A plurality of female fluid coupler sleeve members are mounted in a female fluid coupler sleeve member retainer. A lever is pivotally connected to the female fluid coupler sleeve member retainer by a lever fulcrum pin. A reaction surface slot is provided in the male fluid coupler holder which can receive a pin on the lever. A guide slot is also provided in the male fluid coupler holder which can receive the lever fulcrum pin.

The lever is pivoted in a first direction with the pin on the lever in the reaction surface slot to move the sleeve member of each female fluid coupler to a position in which the first locking ball release recess can receive the locking balls. Continued pivotal movement of the lever in the first direction forces the locking balls into the first locking ball release recesses and forces the male fluid couplers into the male fluid coupler receiving bores. Release of pressure on the lever permits the spring assembly to move the sleeve members, cam the locking balls into the locking ball grooves and positions the lands in positions to hold the locking balls in the locking ball grooves thereby locking the male and female couplers together.

The lever is pivoted in a second direction to move the sleeve members to positions in which the second locking ball release recesses can receive the locking balls. Continued pivotal movement of the lever in the second direction forces the locking balls into the second locking ball release recess and forces the male fluid couplers out of the male fluid coupler receiving bores. As the male fluid couplers move from the male fluid coupler bore in each female fluid coupler, the spring assemblies return each sleeve member to a position with the land adjacent to the locking ball passages.

The foregoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 1 is an end elevational view of the coupler connecting mechanism with the male and female fluid couplers disconnected;

FIG. 2 is a top plan view of the coupler connecting mechanism;

Figure 3:
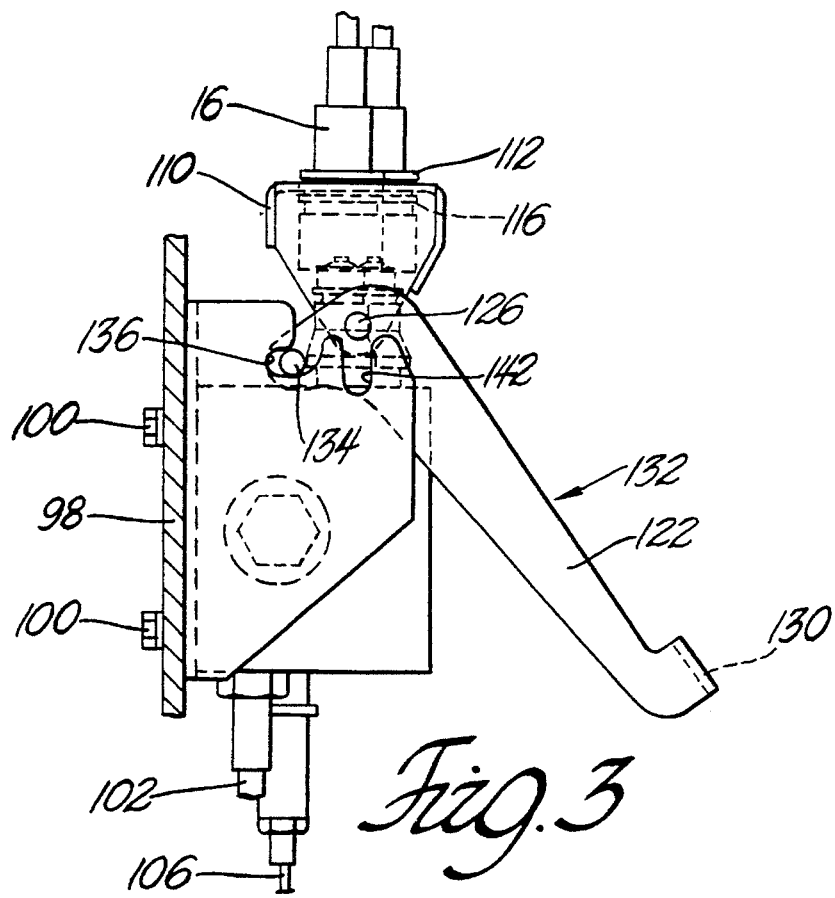
FIG. 3 is an end elevational view of the coupler connecting mechanism with the male fluid couplers starting to enter the female fluid couplers.

The connector mechanism 10 of this invention is for simultaneously connecting a plurality of fluid coupler assemblies 12 each of which has a male fluid coupler 14 and a female fluid coupler 16. The connector mechanism 10, as shown in the drawing, is specifically for use with a quick attach front end loader on a wheeled tractor. Loader attachments for agricultural tractors generally have a loader mounting assembly attached directly to the tractor frame. The loader mast assembly, loader boom and loader bucket can be attached to and uncoupled from the loader mounting assembly in less than about five minutes. The quick attach feature allows the tractor operation to remove the loader attachment form the tractor when the tractor is used for operations, such as cultivating soil between rows of growing plants, where the loader attachment is not needed or would interfere with the operations being performed by the tractor. Loader attachments generally have double acting hydraulic cylinders for raising and lowering the loader boom and bucket and one or more double acting hydraulic cylinders for tilting the bucket. At least four hydraulic pipes must be connected to the loader attachment to control the loader. To remove and reattach the loader attachment quickly, it must be possible to correctly and quickly couple or uncouple the required hydraulic pipes.

The connector mechanism 10 is not limited to use with tractors or loaders. It can be used with most machines that require the connecting and disconnecting of a plurality of fluid coupler assemblies 12. The machine can be stationary or mobile and the fluid can be a gas or a liquid. The fluid couplers 12 could also convey a variety of different fluid assemblies.

Figure 6:
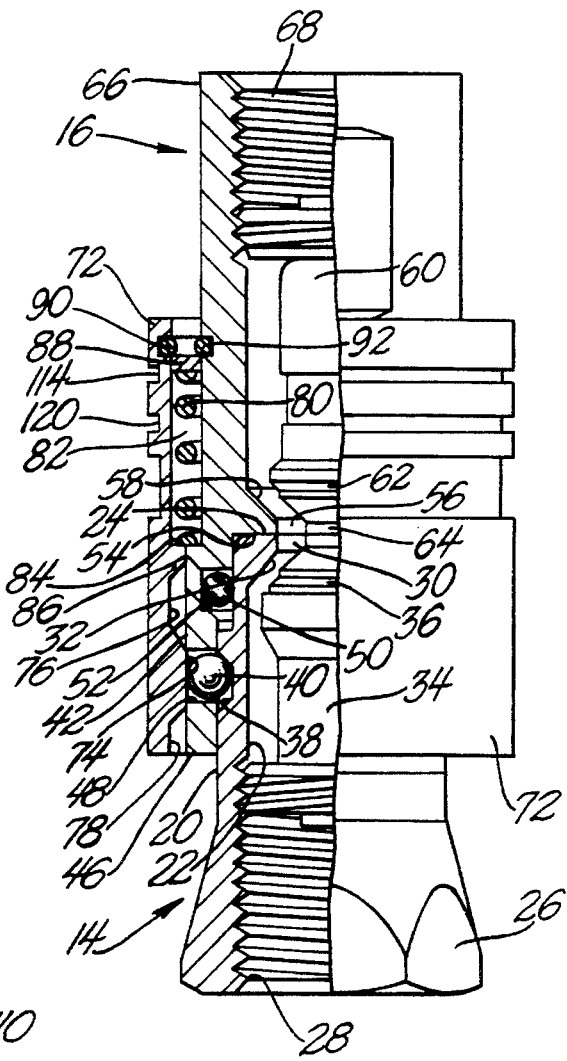
FIG. 6 is an enlarged sectional view showing a male fluid coupler locked in engagement with a female fluid coupler.

The male fluid couplers 14, as shown in FIGS. 1 and 6 have a tubular body 18 with an outer surface 20, an inner bore 22 and an end surface 24. The base 26 of the tubular body 18 has a threaded position 28 that can be used to attach the male fluid coupler 14 to a fluid conduit. The end surface 24 surrounds a fluid passage 30. A conical valve seat 32 is provided inside the tubular body 18 and surrounds the fluid passage 30. A spring loaded valve gate 34 has a valve seat 36 that contacts the conical valve seat 32 and closes the fluid passage 30 when the male fluid coupler 14 is disengaged from a female fluid coupler 16, as shown in FIG. 1. The outer surface 20 of the tubular body 18 has a recessed locking ball groove 38 that is spaced from the end surface 24. The recessed locking ball groove 38, as shown in the drawing, extends 360° around the tubular body 18. The locking ball groove 38 could be small grooves for one or a few locking balls 40, if desired, rather than a single groove that extends completely around the tubular body 18.

The female fluid coupler 16, as shown in FIG. 6, has a cylindrical housing 42. A male coupler receiving bore 44 is provided in the open end 46 of the cylindrical housing 42. The male coupler receiving bore 44 is cylindrical, as shown in the drawing, and outer surface 20 of the male fluid coupler 24 is also cylindrical. The male coupler receiving bore 44 could be conical or some other shape as long as the outer surface 20 of the male fluid coupler 14 has a compatible shape and size.

A plurality of locking ball passages 48 are provided in the cylindrical housing 42 of the female fluid coupler 16. The locking ball passages 48 extend generally radially toward a central axis of the female fluid coupler 16. The locking ball passages 48 are slightly larger in diameter than the locking balls 40. A locking ball retainer (not shown) is provided to keep the locking balls 40 from leaving the locking ball passages 48 when the male fluid coupler 14 is withdrawn from the female fluid coupler 16. An O-ring 50 is provided in an O-ring groove 52 in the male coupler receiving bore 44 to seal against the male fluid coupler 14. A stop surface 54 at the base of the male coupler receiving bore 44 contacts the end surface 24 on the male fluid coupler 14 to limit penetration of the male fluid coupler 14 when the recessed locking ball groove 38 is in alignment with the locking balls 40 and the locking ball passages 48. The stop surface 54 surrounds a fluid passage 56. A conical valve seat 58 is provided inside the cylindrical housing 42 and surrounds the fluid passage 56. A spring loaded valve gate 60 has a valve seat 62 that contacts the conical valve seat 58 and closes the fluid passage 56 when the male fluid coupler 14 is disengaged from the female fluid coupler 16. As shown in FIG. 6, an end surface of the spring loaded valve gate 34 has contacted the spring loaded valve gate 60 at 64, compressed the springs and opened the fluid passages 30 and 56 to allow fluid to pass through the fluid coupler assembly 12. The cylindrical housing 42 has a base 66 with a threaded portion 68 that is used to connect the female fluid coupler 14 to a flexible fluid pipe 70.

A sleeve member 72 is slidably supported on the outer surface of the cylindrical housing 42. The sleeve member 72 has a land 74, a first locking ball release recess 76 and a second locking ball release recess 78. Ramps are provided on both sides of the land 74 to cam locking balls 40 out of the first and second locking ball release recesses 76 and 78 and onto the land.

A compression spring 80 is mounted in a chamber 82 between the cylindrical housing 42 and the sleeve member 72. One end of the compression spring 80, as shown in FIG. 6, contacts the sleeve abutment surface 84 and the spring abutment surface 86 on the cylindrical housing 42. The other end of the compression spring 80 contact a washer 88. The washer abuts against a snap ring 90 in a groove in the sleeve member 72 and a snap ring 92 in a groove in the cylindrical housing 42. To move the sleeve member 72 and the first locking ball release recess 76 to receive locking balls 40, the compression spring 80 is compressed between the washer 88 and the spring abutment surface 86 and the washer will move away from the snap ring 92 and remain in contact with the snap ring 90. To move the sleeve member 72 and the second locking ball release recess 78 to receive locking balls 40, the compression spring 80 is compressed between the washer 88 and the sleeve abutment surface 84 and the washer will be held by the snap ring 92 and the snap ring 90 will move away from the washer. As shown in the drawing and described above the sleeve member 72 can be rotated relative to the cylindrical housing 42. If desired, the first and second locking ball release recesses 76 and 78 could each be changed from a continuous groove to a series of recesses and the sleeve member 72 could be prevented from rotating.

The following description of the connector mechanism 10 frequently refers to a single male fluid coupler 14 or a single female fluid coupler 16. It is to be understood that the connector mechanism 10 can accommodate one or more fluid coupler assemblies 12. Each fluid coupler assembly 12 includes a male fluid coupler 14 and a female fluid coupler 16.

Figure 7:
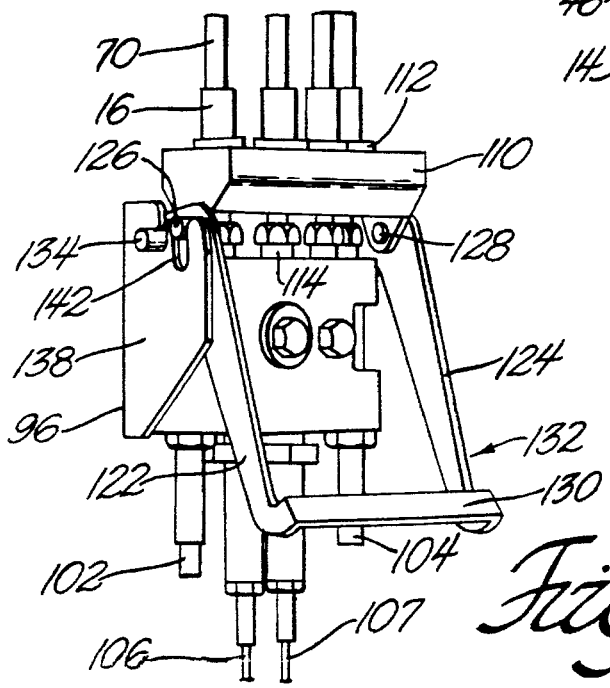
FIG. 7 is a perspective view of the coupler connecting mechanism with the male fluid couplers partially inserted into the female fluid couplers.

A hydraulic spool valve 94 is attached to a male fluid coupler holder 96. The male fluid coupler holder 96 is attached to a frame member 98 of a loader or other machine by bolts 100. Four male fluid couplers 14 are connected directly to the spool valve 94, as shown in the drawing. If desired, the male fluid couplers 14 could be connected directly to the male fluid coupler holder 96 and connected to the spool valve 94 by pipes. A pipe 102 delivers fluid under pressure to the spool valve 94 from a pump. A pipe 104, shown in FIG. 7, delivers fluid form the spool valve 96 to a sump. The spool valve 94 has a spool controlled by a Boden wire 105 and a spool controlled by a Boden wire 107. If desired the spools could be controlled by solenoids.

Four female fluid couplers 16 each have their sleeve member 72 inserted into one of the apertures 108 in a female fluid coupler sleeve member retainer 110. Snap rings 112 in snap ring groove 114 and snap ring 116 in snap ring groove 120 retain each female fluid coupler 16 in an aperture 108. A flexible fluid pipe 70, attached to each female fluid coupler 16, conveys hydraulic fluid to or from actuators on a machine.

Figure 4:
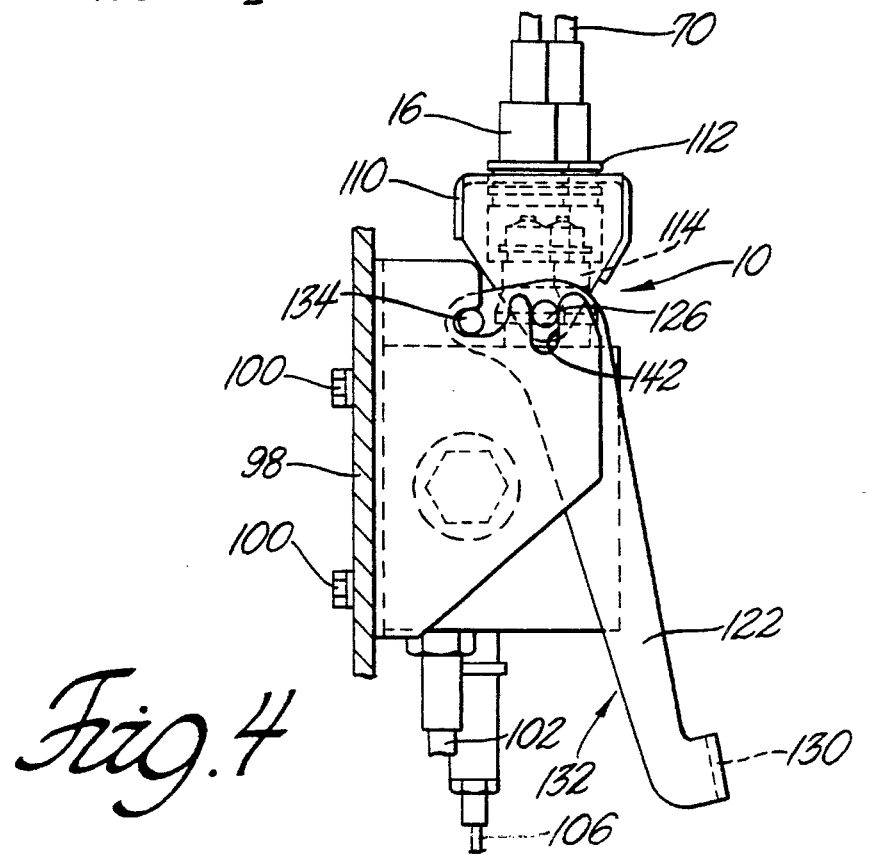
FIG. 4 is an end elevational view of the coupler connecting mechanism with the male fluid couplers partially inserted into the female fluid couplers.
Figure 5:
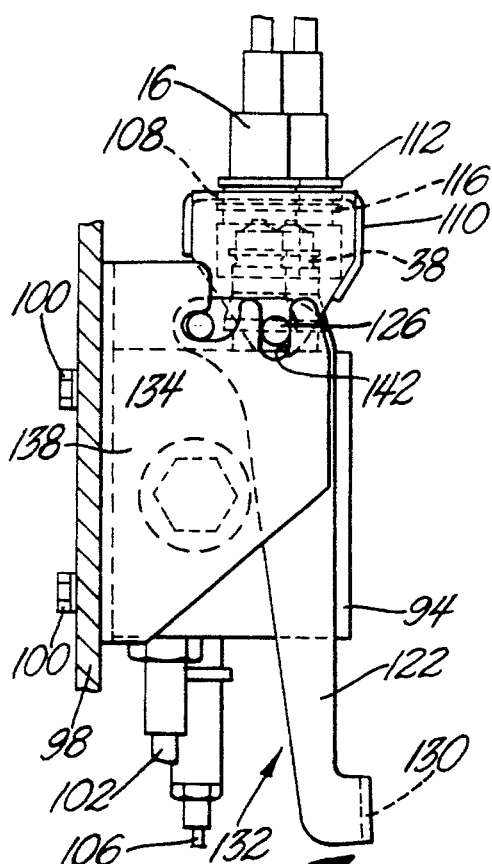
FIG. 5 is an end elevational view of the coupler connecting mechanism with the male fluid couplers locked in the female fluid couplers.

A lever arm 122 and a lever arm 124 are pivotably attached to the sleeve member retainer 110 by coaxial pins 126 and 128. A handle 130 is secured to each lever arm 122 and 124 to form a lever assembly 132. A pin 134 and a pin 135 on the lever arms 122 and 124 enter slots 136 in wings 138 and 140 of the male fluid coupler holder 96. Clockwise movement of the lever 132, as shown in FIGS. 3, 4 and 5 of the drawing moves the pins 134 and 135 against the upper surface of each of the slots 136 and moves the female fluid couplers 16 toward the male fluid couplers 14. Counter clockwise movement of the lever 132, as shown in FIGS. 3, 4 and 5 of the drawing moves the pins 134 and 135 against a lower surface of each of the slots 136 and moves the female fluid couplers 16 away from the male fluid couplers 14. The female fluid coupler sleeve member retainer 110 is guided in a generally straight line by the male fluid couplers 14 and by the lever 132. That generally straight line is substantially perpendicular to the long axis of the slots 136. The pins 134 and 135 therefore have to slide in the slots 136. Frictional forces on the pins 134 and 135 tend to move the female fluid couplers 16 laterally relative to the male fluid couplers 14. If the frictional forces on the pins 134 and 136 is to large, it can interfere with connecting and unconnecting the fluid coupler assemblies 12. If required, slots 142 can be provided in the wings 138 and 140 of the male fluid coupler holder 96 for receiving and guiding the coaxial pins 126 and 128. The slots 142 extend substantially perpendicular to the slots 136. The coaxial pins 126 and 128 and the slots 140 will take all of the side load from the frictional forces on the pins 134 and 135 as well as side loads on the handle 130 thereby insuring that the female fluid connectors 16 move along a path parallel to a long axis of the male fluid couplers 14. The frictional force between the pins 134 and 135 and the slots 136 will in most cases be small.

To operate the fluid coupler connector mechanism 10 to connect each of the fluid coupler assemblies 12, an operator manually aligns the female fluid couplers 16 with the male fluid couplers 14 and starts the pins 134 and 135 in the slots 136, as shown in FIG. 3. The lever 132 is then rotated clockwise from the position shown in FIG. 3. Clockwise movement of the lever 132 about the axis of the coaxial pins 126 and 128 starts the male fluid connectors into the male coupler receiving bore 44 and moves the sleeve member 72 relative to the cylindrical housing 42 until the first locking ball release recess 76 is in alignment with the locking balls 40 and the locking ball passages 48. Continued clockwise movement of the lever 132, as shown in FIG. 4, causes the male fluid connector 14 to cam the locking balls 40 into the first locking ball release recess 76 and moves the end surface 24 of the male fluid coupler 14 into contact with the stop surface 54 at the base of the male coupler receiving bore 44. As the end surface 24 moves toward contact with the stop surface 54, the valve gate 34 contacts the valve gate 60 and the fluid passages 30 and 56 are opened. Release of manual pressure on the handle 130 allows the compression spring 80 to expand, slide the sleeve member 72 toward the base 66 of the female fluid coupler 16, cam the locking balls 40 into the recessed locking ball groove 38 and positions the land 74 in alignment with the locking balls 40 to lock the male fluid coupler 14 in the female fluid coupler 16 as shown in FIGS. 5 and 6.

To disconnect each of the fluid coupler assemblies 12, the lever 132 is rotated counterclockwise form the position shown in FIG. 5. Movement of the lever 132 slides the sleeve member 72 relative to the cylindrical housing 42 from the position shown in FIG. 6, until the second locking ball release recess 78 is in alignment with the locking balls 40 and the locking ball passages 48. Continued counterclockwise movement of the lever causes the locking balls 40 to be cammed from the recessed locking ball groove 38 and into the second locking ball release recess 78. Once the locking balls 40 are cammed from the recessed locking ball groove 38, the male fluid coupler 14 is forced to separate from the female fluid coupler 16. The valve gates 34 and 60 close the fluid passages 30 and 56 as the male fluid coupler separates from the stop surface 54. As soon as there is sufficient separation between the male fluid coupler 14 and the female fluid coupler 16, the compression spring 80 will expand, slide the sleeve member 72 away from the base 66 of the female fluid coupler 16, and cam the locking balls 40 from the second locking ball release recess 78. The pins 134 and 135 are then removed from the slots 136 and the female fluid coupler sleeve member retainer 110 is separated from the male fluid coupler holder 96.

The preferred embodiment of the invention has been described above but is an example only and the invention is not restricted thereto. It will be easily understood by those skilled in the art that modifications and variations can easily be made within the scope of this invention.

I claim:

1. A coupler connecting mechanism for simultaneously connecting a plurality of male fluid couplers, each having a tubular body with an outer surface, an end surface and a locking ball groove recessed into the outer surface and spaced from the end surface, to a plurality of female fluid couplers, each having a cylindrical housing with a male coupler receiving bore, a plurality of locking ball passages through the cylindrical housing, a locking ball mounted in each locking ball passage, a sleeve member slidably supported by and surrounding a portion of the cylindrical housing and having an inside land that holds the locking balls in positions in which the locking balls extend radially into the male coupler receiving bore for engaging said locking ball groove, a first locking ball release recess in the sleeve member on a first side of the land, a second locking ball release recess in the sleeve member on a second side of the land and a spring assembly mounted on the cylindrical housing that biases the inside land on the sleeve member toward a position in which the land holds the locking balls extending radially into the male coupler receiving bore and away from positions in which the first or second locking ball release recesses are in alignment with and can receive locking balls, comprising:

a male fluid coupler holder attached to and holding a plurality of male fluid couplers in fixed positions relative to each other;

a female fluid coupler sleeve member retainer attached to and holding the sleeve member of each of said plurality of female couplers in a fixed position relative to each other; and a lever pivotally connected to the female fluid coupler sleeve member retainer and having a first lever reaction surface engagable with a first holder reaction surface on said male fluid coupler holder to move the coupler sleeve members toward the male fluid couplers, slide the coupler sleeve members relative to the locking ball passages and move the first locking ball release recess into a position to receive the locking balls and move the female fluid couplers and the male fluid couplers into engagement with each other upon movement of the lever in one direction and having a second lever reaction surface engagable with a second holder reaction surface on said male fluid coupler holder to move the coupler sleeve members away from the male fluid couplers, slide the coupler sleeve members relative to the locking ball passages and move the second locking ball release recesses into a position to receive the locking balls and move the male fluid couplers and the female fluid couplers out of engagement with each other upon movement of the lever in another direction.

2. A coupler connecting mechanism as set forth in claim 1 wherein first and second lever reaction surfaces are on one end of the lever, the first holder reaction surface and the second holder reaction surfaces are surfaces of a first slot in the male fluid coupler holder that slidably receives a portion of one end of the lever with the first and second lever reaction surfaces.

3. A coupler connecting mechanism as set forth in claim 2, wherein the male fluid coupler holder has a second slot that slidably receive a pin mounted on the female fluid coupler sleeve member retainer to guide the male fluid couplers during movement into and out of engagement with the female couplers.

4. A coupler connecting mechanism as set forth in claim 3 wherein the pin mounted on the female fluid coupler sleeve member retainer is a fulcrum for the lever.

5. A coupler connecting mechanism as set forth in claim 3, wherein the male fluid coupler holder includes a control valve body with the male fluid couplers attached to the control valve body and a plate member, with the first slot and the second slot, attached to the control valve body.

6. A coupler connecting mechanism as set forth in claim 1 wherein the male fluid coupler holder includes a control valve body with the male fluid couplers attached to the control valve body.

7. A coupler connecting method for simultaneously connecting a plurality of male fluid couplers, each having a tubular body with outer surface, an end surface and a locking ball groove recessed into the outer surface and spaced from the end surface, to a plurality of female fluid couplers, each having a cylindrical housing with a male coupler receiving bore, a plurality of locking ball passages through the cylindrical housing, a locking ball mounted in each locking ball passage, a sleeve member slidably supported by and surrounding a portion of the cylindrical housing and having an inside land that holds the locking balls in positions in which the locking balls extend radially into the male coupler receiving bore, a first locking ball release recess in the sleeve member on a first side of the land, a second locking ball release recess in the sleeve member on a second side of the land and a spring assembly mounted on the cylindrical housing that biases the inside land on the sleeve member toward a position in which the land holds the locking balls and away from positions in which the first or second locking ball release recesses are in alignment with and can receive locking balls, comprising the method steps of:

a. holding a plurality of the male fluid couplers in fixed positions relative to each other;

b. mounting a plurality of the female fluid coupler sleeves in a female coupler sleeve member retainer plate;

c. placing the female fluid coupler sleeve member retainer plate in a position adjacent to the male couplers with the male couplers in alignment with the male coupler receiving bores in the female fluid couplers;

d. moving each female coupler sleeve relative to the cylindrical housing to a position which allows the retainer balls to enter the first locking ball release recess in the sleeve member;

e. forcing the female coupler sleeve member retainer plate and the female fluid couplers into full engagement with the male fluid couplers;

f. releasing pressure on the coupler sleeve member retainer plate to allow the spring assembly of each female fluid couple member to move the sleeve member relative to the cylindrical housing and force the locking balls out of the first locking ball release recesses and into the locking ball grooves to lock each of the male fluid couplers to one of the female couplers;

g. forcing the fluid coupler sleeve member retainer plate away from the male couplers to move the sleeve members relative to the cylindrical housing and free the retainer balls to move from the locking ball grooves and into the second locking ball release recesses;

h. continuing movement of the fluid coupler sleeve member retainer plate away from the male fluid couplers until the male and female fluid couplers are completely disengaged; and i. moving the fluid coupler sleeves relative to the cylindrical housing to force the locking balls from the second locking ball release recesses and position the lands of the fluid coupler sleeves to hold the locking balls in positions in which each locking ball extends into the male coupler receiving bore.

* * * * *